(12) United States Patent
Fukushi

(10) Patent No.: US 11,130,829 B2
(45) Date of Patent: Sep. 28, 2021

(54) PEROXIDE-CURABLE FLUOROPOLYMER COMPOSITION INCLUDING SOLVENT AND METHOD OF USING THE SAME

(71) Applicant: 3M INNOVATIVE PROPERTIES COMPANY, St. Paul, MN (US)

(72) Inventor: Tatsuo Fukushi, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/793,947

(22) Filed: Feb. 18, 2020

(65) Prior Publication Data

US 2020/0181302 A1    Jun. 11, 2020

Related U.S. Application Data

(62) Division of application No. 14/440,693, filed as application No. PCT/US2013/067964 on Nov. 1, 2013, now abandoned.

(60) Provisional application No. 61/722,516, filed on Nov. 5, 2012.

(51) Int. Cl.
| | |
|---|---|
| C08F 214/28 | (2006.01) |
| C08K 5/14 | (2006.01) |
| C08J 3/24 | (2006.01) |
| C09D 127/16 | (2006.01) |
| C08J 5/18 | (2006.01) |
| C08K 5/3492 | (2006.01) |

(52) U.S. Cl.
CPC ............... *C08F 214/28* (2013.01); *C08J 3/24* (2013.01); *C08J 5/18* (2013.01); *C08K 5/14* (2013.01); *C08K 5/34924* (2013.01); *C09D 127/16* (2013.01); *C08J 2327/20* (2013.01)

(58) Field of Classification Search
USPC ....................................................... 524/544
See application file for complete search history.

(56) References Cited

U.S. PATENT DOCUMENTS

| | | | |
|---|---|---|---|
| 2,559,752 A | 7/1951 | Berry | |
| 2,968,649 A | 1/1961 | Pailthorp | |
| 3,051,677 A | 8/1962 | Rexford | |
| 3,318,854 A | 5/1967 | Honn | |
| 3,452,126 A | 6/1969 | Sieron | |
| 3,507,844 A | 4/1970 | Wood | |
| 4,141,874 A | 2/1979 | Oka | |
| 4,621,116 A | 11/1986 | Morgan | |
| 5,268,405 A | 12/1993 | Ojakaar | |
| 5,285,002 A | 2/1994 | Grootaert | |
| 5,378,782 A | 1/1995 | Grootaert | |
| 5,442,097 A | 8/1995 | Obermeier | |
| 6,410,630 B1 | 6/2002 | Hoover | |
| 6,429,258 B1 | 8/2002 | Morgan | |
| 6,613,941 B1 | 9/2003 | Felix | |
| 6,706,193 B1 | 3/2004 | Burkard | |
| 6,720,360 B1 | 4/2004 | Grootaert | |
| 6,794,550 B2 | 9/2004 | Hintzer | |
| 7,018,541 B2 | 3/2006 | Hintzer | |
| 8,835,551 B2 | 9/2014 | Fukushi | |
| 2005/0171257 A1 | 8/2005 | Wakui | |
| 2005/0187331 A1 | 8/2005 | Yuan | |
| 2006/0105285 A1 | 5/2006 | Jing | |
| 2006/0199898 A1 | 9/2006 | Funaki | |
| 2006/0223924 A1 | 10/2006 | Tsuda | |
| 2006/0281946 A1 | 12/2006 | Morita | |
| 2007/0015864 A1 | 1/2007 | Hintzer | |
| 2007/0015865 A1 | 1/2007 | Hintzer | |
| 2007/0060699 A1 | 3/2007 | Tsuda | |
| 2007/0117915 A1 | 5/2007 | Funaki | |
| 2007/0142513 A1 | 6/2007 | Tsuda | |
| 2007/0142541 A1 | 6/2007 | Hintzer | |
| 2010/0286329 A1 | 11/2010 | Fukushi | |
| 2011/0206878 A1 | 8/2011 | Sullivan | |
| 2012/0088884 A1 | 4/2012 | Fukushi | |
| 2013/0109790 A1 | 5/2013 | Fukushi | |

FOREIGN PATENT DOCUMENTS

| | | |
|---|---|---|
| GB | 950084 | 2/1964 |
| JP | 62-263272 | 11/1987 |
| JP | 2-261850 | 10/1990 |
| JP | 4-275342 | 9/1992 |
| WO | 94/12580 | 6/1994 |

(Continued)

OTHER PUBLICATIONS

Carter, "Updated Maximum Incremental Reactivity Scale And Hydrocarbon Bin Reactivities for Regulatory Applications", Jan. 28, 2010. 64 pages.
Burke, J., Solubility Parameters: Theory and Application, The Book and Paper Group Annual, v.3, 1984.
DuPont Diak-7 Material Safety Data Sheet, Nov. 2012.
Hansen et al., Hansen Solubility Parameters, A User's Handbook, Chapter 1, Solubility Parameters—an Introduction, CRC Press LLC, 2000.
https://www.accudynetest.com/solubility_table_print.html; 2018.

(Continued)

*Primary Examiner* — Fred M Teskin
(74) *Attorney, Agent, or Firm* — Kathleen B. Gross

(57) ABSTRACT

A curable composition that includes an amorphous, peroxide-curable fluoropolymer having a first solubility parameter, a solvent having a second solubility parameter, and a peroxide. The amorphous, peroxide-curable fluoropolymer is present from 60 percent to 97.5 percent by weight versus the weight of the curable composition, and the solvent is present from 1 percent to 39 percent by weight versus the weight of the curable composition. The absolute value of the first solubility parameter minus the second solubility parameter is less than or equal to 8.2 $(MPa)^{1/2}$. The solvent may have a solubility parameter in a range from 9.6 $(MPa)^{1/2}$ to 26 $(MPa)^{1/2}$. Methods of making a cured fluoroelastomer from the curable composition are also disclosed.

20 Claims, No Drawings

(56) References Cited

FOREIGN PATENT DOCUMENTS

| WO | 2009-036131 | 3/2009 |
| WO | 2010-147815 | 12/2010 |
| WO | 2012-006487 | 1/2012 |

OTHER PUBLICATIONS

Myers, "Elastomer Solvent Interactions III—Effects of Methanol Mixtures on Fluorocarbon Elastomers", Journal of Applied Polymer Science, 1986, vol. 32, pp. 3515-3539.
Riddick, John A.; Bunger, William B.; and Sakano, Theodore K.; Techniques Of Chemistry, vol. II, Organic Solvents, Physical Properties and Methods of Purification, Fourth Edition, Copyright 1986, by John Wiley & Sons, Inc., pp. 348, 403, 396, 339, 386, 392, 345, 337, 385, 197, 193, 435, 191.
Taminco Dimethylacetamide Technical Data Sheet, 2008.
"Volatile organic Compounds Definition per 40 CFR Part 51.100(s) (as amended through Jan. 21, 2009", 2009, 2 pages.
Wikipedia "Elastomer", https://web.archive.org/web/20120924021457/ http://en.wikipedia.org/wiki/Elastomer; Sep. 2012.
International Search Report for PCT International Application No. PCT/US2013/067964 dated Mar. 4, 2014, 3 pages.

PEROXIDE-CURABLE FLUOROPOLYMER COMPOSITION INCLUDING SOLVENT AND METHOD OF USING THE SAME

CROSS REFERENCE TO RELATED APPLICATION

This application is a divisional of U.S. application Ser. No. 14/440,693, filed May 5, 2015, which is a national stage filing under 35 U.S.C. 371 of PCT/US2013/067964, filed Nov. 1, 2013, which claims priority to U.S. Provisional Application No. 61/722,516, filed Nov. 5, 2012, the disclosures of which are incorporated by reference in their entirety herein.

BACKGROUND

Fluoroelastomers including copolymers of vinylidene fluoride (VDF) and hexafluoropropylene (HFP) and copolymers of tetrafluoroethylene (TFE), vinylidene fluoride (VDF), and hexafluoropropylene (HFP) are known to have excellent mechanical properties, heat resistance, weather resistance, and chemical resistance, for example. Such beneficial properties render fluoroelastomers useful for example, as O-rings, seals, hoses, skid materials, and coatings (e.g., metal gasket coating for automobiles). Many of the copolymers used to make fluoroelastomers have relatively high viscosities in comparison to other materials used to make elastomers (e.g., silicones for silicone elastomers). Some relatively low viscosity fluoropolymer compositions for fluoroelastomers have been reported (see, e.g., U.S. Pat. Appl. Pub. No. 2010/0286329 (Fukushi et al.). Also, U.S. Pat. No. 6,410,630 (Hoover et al.) reports a high solids fluoroelastomer composition.

Peroxides have been used to crosslink polymers to make cured fluoroelastomers. Peroxide-curable fluoropolymers typically have bromine or iodine cure sites or end groups. Certain peroxides have recently been shown to increase the cure speed of amorphous fluoropolymers in U.S. Pat. Appl. Pub. No. 2012/0088884 (Fukushi et al.).

SUMMARY

The present disclosure provides a curable composition of an amorphous, peroxide-curable fluoropolymer and a solvent, useful, for example, for making cured fluoroelastomers. The curable compositions have at least one of the following unexpected properties: (1) an unexpectedly low viscosity in view of the high weight percentage of amorphous peroxide-curable fluoropolymer in the composition or (2) an unexpected ability to cure in view of the solvent present in the composition.

In one aspect, the present disclosure provides a curable composition that includes an amorphous, peroxide-curable fluoropolymer having a first solubility parameter, a solvent having a second solubility parameter, and a peroxide. The amorphous, peroxide-curable fluoropolymer is present from 60 percent to 97.5 percent by weight versus the weight of the curable composition, and the solvent is present from 1 percent to 39 percent by weight versus the weight of the curable composition. The absolute value of the first solubility parameter minus the second solubility parameter is less than or equal to 8.2 $(MPa)^{1/2}$.

In another aspect, the present disclosure provides a curable composition that includes an amorphous, peroxide-curable fluoropolymer, a solvent, and a peroxide. The amorphous, peroxide-curable fluoropolymer is present from 60 percent to 97.5 percent by weight versus the weight of the curable composition. The solvent has a solubility parameter in a range from 9.6 $(MPa)^{1/2}$ to 26 $(MPa)^{1/2}$ and is present from 1 percent to 39 percent by weight versus the weight of the curable composition.

In another aspect, the present disclosure provides a method of making a cured fluoroelastomer. The method includes providing the curable composition disclosed herein and heating the curable composition at a cure temperature to make the cured fluoroelastomer.

Typically, when a peroxide-curable polymer is dissolved in a solvent, the solvent is removed by drying before attempting to cure the polymer because typical hydrocarbon solvents can react with radicals, for example, by hydrogen abstraction. Even residual solvent can interfere with crosslinking. Surprisingly, the curable composition disclosed herein can be cured without removing the solvent.

Accordingly, in another aspect, the present disclosure provides a method of making a cured fluoroelastomer. The method includes providing the curable composition disclosed herein and heating the curable composition at a cure temperature to make the cured fluoroelastomer without first removing the solvent.

In this application:

Terms such as "a", "an" and "the" are not intended to refer to only a singular entity, but include the general class of which a specific example may be used for illustration. The terms "a", "an", and "the" are used interchangeably with the term "at least one".

The phrase "comprises at least one of" followed by a list refers to comprising any one of the items in the list and any combination of two or more items in the list. The phrase "at least one of" followed by a list refers to any one of the items in the list or any combination of two or more items in the list.

The term "solvent" refers to a homogeneous liquid material (inclusive of combinations of two or more materials) that has a boiling point and that is capable of at least partially dissolving the amorphous peroxide-curable fluoropolymer at 25° C.

The terms "cure" and "curable" joining polymer chains together by covalent chemical bonds, usually via crosslinking molecules or groups, to form a network polymer. Therefore, in this disclosure the terms "cured" and "crosslinked" may be used interchangeably. A cured or crosslinked polymer is generally characterized by insolubility, but may be swellable in the presence of an appropriate solvent.

All numerical ranges are inclusive of their endpoints and nonintegral values between the endpoints unless otherwise stated.

DETAILED DESCRIPTION

It can be useful to deliver amorphous fluoropolymers out of solvent to make cured fluoroelastomers. For example, uncured amorphous fluoropolymers, sometimes referred to as fluoroelastomer gums, can be dissolved in solvent and coated on a substrate. The typical amorphous polymer content of these solutions can be from 20% to 50% by weight versus the weight of the solution. Higher fluoropolymer content in these solutions (for example, at least 60% by weight fluoropolymer) may be desirable to increase coating thickness and to reduce volatile organic compounds (VOCs). Increasingly stringent volatile organic compound (VOC) regulations for paints, sealants, and caulk demand that their formulations minimize the use of solvents, which impact ground-level ozone by photochemical reaction. However, it is difficult to make a solution containing over 50% by weight fluoropolymer because the viscosity of such solutions increases rapidly as concentration increases and because the solubility of amorphous fluoropolymers in certain solvents is limited.

The viscosity of a solution of amorphous fluoropolymer generally increases as the molecular weight of the amorphous fluoropolymer increases. Accordingly, amorphous fluoropolymers having relatively low molecular weights can be useful for making solvents with higher fluoropolymer content and/or lower solution viscosity. If the molecular weight of the amorphous fluoropolymer is too low, however, it will be difficult to cure. Finding the balance between molecular weight and curing can be challenging. Also, as mentioned above, when it is desirable to cure an amorphous fluoropolymer dissolved in a solvent with a peroxide, the solvent is typically removed by drying before attempting to cure the polymer because typical hydrocarbon solvents can react with radicals, for example, by hydrogen abstraction. Even residual solvent can interfere with the curing or crosslinking reaction.

The curable compositions according to the present disclosure include a relatively high weight percent of amorphous fluoropolymer in certain solvents. The amorphous fluoropolymer is in a range from 60% to 97.5% by weight of the amorphous fluoropolymer versus the weight of the curable composition. In some embodiments, the amorphous fluoropolymer is not present at 80% by weight versus the weight of the curable compositions. For example, in certain embodiments, the amorphous fluoropolymer is present in a range from 60% to less than 80% by weight versus the weight of the curable composition. In these embodiments, the solvent may be present in a range from 19% to 39% by weight versus the weight of the curable composition. In some of these embodiments, the amorphous fluoropolymer may be present in a range from 60% up to 79%, 78%, 77%, 76%, 75%, or less than 75% by weight, versus the weight of the curable composition. In other embodiments, the amorphous peroxide-curable fluoropolymer is present in a range from greater than 80 percent by weight to 97.5 percent by weight versus the weight of the curable composition. In these embodiments, the solvent may be present in a range from 1% to 19% versus the weight of the curable composition. In some of these embodiments, the amorphous fluoropolymer may be present in a range from 81% to 97.5%, 81% to 95%, greater than 80% to 90%, or greater than 90% to 97.5% by weight, versus the weight of the curable composition.

In the curable compositions disclosed herein, the absolute value of the solubility parameter difference between the amorphous fluoropolymer ($\delta_a$) and solvent ($\delta_b$) may be less than or equal to 8.2 $(MPa)^{1/2}$ (4 $(cal/cc)^{1/2}$). In other words, $|\delta_a-\delta_b| \leq 8.2$ $(MPa)^{1/2}$. In some embodiments, the absolute value of the solubility parameter difference between fluoropolymer ($\delta_a$) and solvent ($\delta_b$) is less than or equal to 6.1 $(MPa)^{1/2}$ (3 $(cal/cc)^{1/2}$), or less than or equal to 4.1 $(MPa)^{1/2}$ (2 $(cal/cc)^{1/2}$). The solubility parameter, $\delta$, of a fluoroelastomer including VDF and HFP in a 78/22 molar ratio is reported to be 8.7 $(cal/cc)^{1/2}$ (17.8 $(MPa)^{1/2}$) in Myers and Abu-Isa, *Journal of Applied Polymer Science*, Vol. 32, 3515-3539 (1986). For the purposes of this application, the solubility parameter of an amorphous fluoropolymer is considered to be 17.8 $(MPa)^{1/2}$, and the solvent has a solubility parameter in a range from 9.6 $(MPa)^{1/2}$ to 26 $(MPa)^{1/2}$, in some embodiments, 11.7 $(MPa)^{1/2}$ to 23.9 $(MPa)^{1/2}$, and in some embodiments, 13.7 $(MPa)^{1/2}$ to 21.9 $(MPa)^{1/2}$.

Solvents useful for practicing the present disclosure have a boiling point and can be removed from the cured fluoroelastomers made from curable compositions disclosed herein, if desired, using normal drying procedures with heat or reduced pressure. These features distinguish the solvents from ionic liquids (e.g., those disclosed in International Application Publication No. WO 2012/006487 (Fukushi et al.), and solvents useful for practicing the present disclosure do not include ionic liquids. In some embodiments, including any of the aforementioned embodiments of the curable compositions disclosed herein, the solvent has a boiling point in a range from 30° C. to 200° C. If the boiling point of the solvent is lower than 30° C., it is difficult to maintain a consistent solid content during, for example, coating process. If the boiling point of the solvent is higher than 200° C., it can be difficult to remove the solvent, if desired, after the fluoroelastomer is cured. Examples of solvents useful for practicing the present disclosure include ketones, esters, carbonates, and formates such as tert-butyl acetate, 4-methyl-2-pentanone, n-butyl acetate, ethyl acetate, 2-butanone, ethyl formate, methyl acetate, cyclohexanone, dimethyl carbonate, acetone, and methyl formate. In some embodiments, the solvent comprises at least one of acetone, 2-butanone, 4-methyl-2-pentanone, cyclohexanone, methyl formate, ethyl formate, methyl acetate, ethyl acetate, n-butyl acetate, tert-butyl acetate, or dimethyl carbonate. In some embodiments, the solvent comprises at least one of ethyl acetate or methyl acetate. In some embodiments, including any of the embodiments of the curable compositions disclosed herein, the solvent is not an alcohol. Alcohols tend to be particularly detrimental to a peroxide-cure. Solvents useful for practicing the present disclosure can be selected based on their ozone impact. The ozone impact of VOCs was calculated and reported as maximum incremental reactivity (MIR) values in units of grams of ozone per gram or VOC. (See, William P. L. Carter, "UPDATED MAXIMUM INCREMENTAL REACTIVITY SCALE AND HYDROCARBON BIN REACTIVITIES FOR REGULATORY APPLICATIONS" (Revised Jan. 28, 2010)). Certain solvents have been found to have negligible photochemical reactivity and are listed as VOC exempt in 40 CFR Part 51.100(s) (as amended through Jan. 21, 2009). In some embodiments, the solvent useful for practicing the present disclosure has a calculated ozone impact of up to 0.35 on the maximum incremental reactivity (MIR) scale measured in units of grams of ozone per grams of solvent. In some of these embodiments, curable compositions according to the present disclosure with their high polymer content and low ozone impact can provide low ground-level ozone.

Some solvents useful for practicing the present disclosure are shown in the table, below. The solubility parameters, boiling points, and MIR values of the solvents are summarized. The table also includes alcohol solvents for comparison.

| Solvent | Solubility parameter $(cal/cc)^{1/2}$ | Solubility parameter $MPa^{1/2}$ | Boiling Point (° C.) | MIR ($O_3$ g/ solvent g) |
|---|---|---|---|---|
| tert-butyl acetate (TBA) | 7.7 | 15.8 | 98 | 0.18 |
| 4-methyl-2-pentanone (MIBK) | 8.4 | 17.2 | 117 | 3.88 |
| n-butyl acetate (BA) | 8.5 | 17.4 | 126 | 0.83 |
| amorphous fluoropolymer | 8.7 | 17.8 | Not available | Not available |
| ethyl acetate (EA) | 9.1 | 18.6 | 77 | 0.63 |
| 2-butanone (MEK) | 9.3 | 19.0 | 80 | 1.48 |
| ethyl formate (EF) | 9.4 | 19.2 | 54 | 0.48 |
| methyl acetate (MA) | 9.6 | 19.6 | 57 | 0.072 |

-continued

| Solvent | Solubility parameter (cal/cc)$^{1/2}$ | MPa$^{1/2}$ | Boiling Point (° C.) | MIR (O$_3$ g/ solvent g) |
|---|---|---|---|---|
| cyclohexanone | 9.9 | 20.3 | 156 | 1.35 |
| dimethyl carbonate (DMC) | 9.9 | 20.3 | 90 | 0.059 |
| acetone | 10.0 | 20.5 | 56 | 0.36 |
| methyl formate | 10.2 | 20.9 | 32 | 0.057 |
| IPA | 11.5 | 23.5 | 82.5 | 0.61 |
| ethanol | 12.8 | 26.1 | 78 | 1.53 |
| propylene carbonate (PC) | 13.3 | 27.3 | 242 | 0.28 |
| methanol | 14.5 | 29.7 | 65 | 0.67 |

*Calculated ozone impact in the maximum incremental reactivity (MIR) scale in units of grams O$_3$ per gram VOC. (William P. L. Carter, "UPDATED MAXIMUM INCREMENTAL REACTIVITY SCALE AND HYDROCARBON BIN REACTIVITIES FOR REGULATORY APPLICATIONS" (Revised Jan. 28, 2010))

Curable compositions according to the present disclosure also include a peroxide. Typically peroxides useful for practicing the present disclosure are acyl peroxides. Acyl peroxides tend to decompose at lower temperatures than alkyl peroxides and allow for lower temperature curing. In some of these embodiments, the peroxide is di(4-t-butylcyclohexyl)peroxydicarbonate, di(2-phenoxyethyl)peroxydicarbonate, di(2,4-dichlorobenzoyl) peroxide, dilauroyl peroxide, decanoyl peroxide, 1,1,3,3-tetramethylethylbutylperoxy-2-ethylhexanoate, 2,5-dimethyl-2,5-di(2-ethylhexanoylperoxy)hexane, disuccinic acid peroxide, t-hexyl peroxy-2-ethylhexanoate, di(4-methylbenzoyl) peroxide, t-butyl peroxy-2-ethylhexanoate, benzoyl peroxide, t-butylperoxy 2-ethylhexylcarbonate, or t-butylperoxy isopropyl carbonate. In some embodiments, the peroxide is a diacyl peroxide. In some of these embodiments, the peroxide is benzoyl peroxide or a substituted benzoyl peroxide (e.g., di(4-methylbenzoyl) peroxide or di(2,4-dichlorobenzoyl) peroxide). The peroxide is present in the curable composition in an amount effective to cure the composition. In some embodiments, the peroxide is present in the composition in a range from 0.5% by weight to 10% by weight versus the weight of the curable composition. In some embodiments, the peroxide is present in the composition in a range from 1% by weight to 5% by weight versus the weight of the curable composition.

In peroxide-cured fluoroelastomers, it is often desirable to include a crosslinker. The crosslinkers may be useful, for example, for providing enhanced mechanical strength in the final cured composition. Accordingly, in some embodiments, the curable composition according to the present disclosure further comprises a crosslinker. Those skilled in the art are capable of selecting conventional crosslinkers based on desired physical properties. Examples of useful crosslinkers include tri(methyl)allyl isocyanurate (TMAIC), triallyl isocyanurate (TAIC), tri(methyl)allyl cyanurate, poly-triallyl isocyanurate (poly-TAIC), xylylene-bis(diallyl isocyanurate) (XBD), N,N'-m-phenylene bismaleimide, diallyl phthalate, tris(diallylamine)-s-triazine, triallyl phosphite, 1,2-polybutadiene, ethyleneglycol diacrylate, diethyleneglycol diacrylate, and CH$_2$=CH—R$_{fl}$—CH=CH$_2$, wherein R$_{fl}$ is a perfluoroalkylene having from 1 to 8 carbon atoms. The crosslinker is typically present in an amount of 1% by weight to 10% by weight versus the weight of the curable composition. In some embodiments, the crosslinker is present in a range from 2% by weight to 5% by weight versus the weight of the curable composition.

Amorphous fluoropolymers useful for practicing the present disclosure may include one or more interpolymerized units derived from at least two principal monomers. Examples of suitable candidates for the principal monomer(s) include perfluoroolefins (e.g., tetrafluoroethylene (TFE) and hexafluoropropylene (HFP), or any perfluoroolefin of the formula CF$_2$=CF—Rf, where Rf is fluorine or a perfluoroalkyl of 1 to 8, in some embodiments 1 to 3, carbon atoms), perfluorovinyl ethers (e.g., perfluoroalkyl vinyl ethers (PAVE) and perfluoroalkoxyalkyl vinyl ethers (PAOVE)), halogenated fluoroolefins (e.g., trifluorochloroethylene (CTFE)), hydrogen-containing monomers such as olefins (e.g., ethylene and propylene) and partially fluorinated olefins (e.g., vinylidene fluoride (VDF), pentafluoropropylene, and trifluoroethylene). Those skilled in the art are capable of selecting specific interpolymerized units at appropriate amounts to form a fluoroelastomer. In some embodiments, polymerized units derived from non-fluorinated olefin monomers are present in the amorphous fluoropolymer at up to 25 mole percent of the fluoropolymer, in some embodiments up to 10 mole percent or up to 3 mole percent. In some embodiments, polymerized units derived from at least one of PAVE or PAOVE monomers are present in the amorphous fluoropolymer at up to 50 mole percent of the fluoropolymer, in some embodiments up to 30 mole percent or up to 10 mole percent.

When the amorphous fluoropolymer is perhalogenated, in some embodiments perfluorinated, typically at least 50 mole percent (mol %) of its interpolymerized units are derived from TFE and/or CTFE, optionally including HFP. The balance of the interpolymerized units of the amorphous fluoropolymer (10 to 50 mol %) is made up of one or more perfluoroalkyl vinyl ethers and/or perfluoroalkoxyalkyl vinyl ethers, and a suitable cure site monomer. When the fluoropolymer is not perfluorinated, it typically contains from about 5 mol % to about 95 mol % of its interpolymerized units derived from TFE, CTFE, and/or HFP, from about 5 mol % to about 90 mol % of its interpolymerized units derived from VDF, ethylene, and/or propylene, up to about 40 mol % of its interpolymerized units derived from a vinyl ether, and from about 0.1 mol % to about 5 mol %, in some embodiments from about 0.3 mol % to about 2 mol %, of a suitable cure site monomer.

Suitable perfluorinated ethers include those of the formula CF$_2$=CFO—(CF$_2$)$_m$—(O(CF$_2$)$_p$)$_n$—ORf, wherein Rf is a perfluorinated (C$_1$-C$_4$) alkyl group, m isl to 4, n is 0 to 6, and p is 1 to 2, or CF$_2$=CF(CF$_2$)$_m$—O—Rf, wherein m is 1 to 4 and Rf is a perfluorinated aliphatic group optionally containing O atoms. Examples of perfluoroalkoxyalkyl vinyl ethers include CF$_2$=CFOCF$_2$OCF$_3$, CF$_2$=CFOCF$_2$OCF$_2$CF$_3$, CF$_2$=CFOCF$_2$CF$_2$OCF$_3$, CF$_2$=CFOCF$_2$CF$_2$CF$_2$OCF$_3$, CF$_2$=CFOCF$_2$CF$_2$CF$_2$CF$_2$OCF$_3$, CF$_2$=CFOCF$_2$OCF$_2$CF$_3$, CF$_2$=CFOCF$_2$CF$_2$OCF$_2$CF$_3$, CF$_2$=CFOCF$_2$CF$_2$CF$_2$OCF$_2$CF$_3$, CF$_2$=CFOCF$_2$CF$_2$CF$_2$CF$_2$OCF$_2$CF$_3$, CF$_2$=CFOCF$_2$CF$_2$OCF$_2$OCF$_3$, CF$_2$=CFOCF$_2$CF$_2$OCF$_2$CF$_2$OCF$_3$, CF$_2$=CFOCF$_2$CF$_2$OCF$_2$CF$_2$CF$_2$OCF$_3$, CF$_2$=CFOCF$_2$CF$_2$OCF$_2$CF$_2$CF$_2$CF$_2$OCF$_3$, CF$_2$=CFOCF$_2$CF$_2$OCF$_2$CF$_2$CF$_2$CF$_2$CF$_2$OCF$_3$, CF$_2$=CFOCF$_2$CF$_2$(OCF$_2$)$_3$OCF$_3$, CF$_2$=CFOCF$_2$CF$_2$(OCF$_2$)$_{40}$CF$_3$, CF$_2$=CFOCF$_2$CF$_2$OCF$_2$OCF$_2$OCF$_3$, CF$_2$=CFOCF$_2$CF$_2$OCF$_2$CF$_2$CF$_3$ and CF$_2$=CFOCF$_2$CF$_2$OCF$_2$CF$_2$OCF$_2$CF$_3$. Mixtures of PAVE and PAOVE may also be employed. Examples of perfluoroalkoxyalkyl allyl ethers that may be included in the amorphous fluoropolymer include CF$_2$=CFCF$_2$OCF$_2$OCF$_3$, CF$_2$=CFCF$_2$OCF$_2$CF$_2$CF$_2$OCF$_3$ and $CF_2$=$CFCF_2OCF_2OCF_3$. These perfluorinated ethers are typically liquids and may be pre-emulsified with an emulsifier before its copolymerization with the other comonomers, for example, addition of a gaseous fluoroolefin.

Examples of amorphous fluoropolymers useful or practicing the present disclosure include a TFE/propylene copolymer, a TFE/propylene/VDF copolymer, a VDF/HFP copolymer, a TFE/VDF/HFP copolymer, a TFE/perfluoromethyl vinyl ether (PMVE) copolymer, a TFE/$CF_2$=$CFOC_3F_7$ copolymer, a TFE/$CF_2$=$CFOCF_3$/$CF_2$=$CFOC_3F_7$ copolymer, a TFE/$CF_2$=$C(OC_2F_5)_2$ copolymer, a TFE/ethyl vinyl ether (EVE) copolymer, a TFE/butyl vinyl ether (BVE) copolymer, a TFE/EVE/BVE copolymer, a VDF/$CF_2$=$CFOC_3F_7$ copolymer, an ethylene/HFP copolymer, a TFE/HFP copolymer, a CTFE/VDF copolymer, a TFE/VDF copolymer, a TFE/VDF/PMVE/ethylene copolymer, and a TFE/VDF/$CF_2$=$CFO(CF_2)_3OCF_3$ copolymer.

The amorphous fluoropolymer presently disclosed is typically prepared by a sequence of steps, which can include polymerization, coagulation, washing, and drying. In some embodiments, an aqueous emulsion polymerization can be carried out continuously under steady-state conditions. In this embodiment, for example, an aqueous emulsion of monomers (e.g., including any of those described above), water, emulsifiers, buffers and catalysts are fed continuously to a stirred reactor under optimum pressure and temperature conditions while the resulting emulsion or suspension is continuously removed. In some embodiments, batch or semibatch polymerization is conducted by feeding the aforementioned ingredients into a stirred reactor and allowing them to react at a set temperature for a specified length of time or by charging ingredients into the reactor and feeding the monomers into the reactor to maintain a constant pressure until a desired amount of polymer is formed. After polymerization, unreacted monomers are removed from the reactor effluent latex by vaporization at reduced pressure. The amorphous fluoropolymer can be recovered from the latex by coagulation.

The polymerization is generally conducted in the presence of a free radical initiator system, such as ammonium persulfate. The polymerization reaction may further include other components such as chain transfer agents and complexing agents. The polymerization is generally carried out at a temperature in a range from 10° C. and 100° C., or in a range from 30° C. and 80° C. The polymerization pressure is usually in the range of 0.3 MPa to 30 MPa, and in some embodiments in the range of 2 MPa and 20 MPa.

When conducting emulsion polymerization, perfluorinated or partially fluorinated emulsifiers may be useful. Generally these fluorinated emulsifiers are present in a range from about 0.02% to about 3% by weight with respect to the polymer. Polymer particles produced with a fluorinated emulsifier typically have an average diameter, as determined by dynamic light scattering techniques, in range of about 10 nanometers (nm) to about 300 nm, and in some embodiments in range of about 50 nm to about 200 nm.

Examples of suitable emulsifiers perfluorinated and partially fluorinated emulsifier having the formula [$R_f$—O-L-COO$^-$]$_i$X$^{i+}$ wherein L represents a linear partially or fully fluorinated alkylene group or an aliphatic hydrocarbon group, $R_f$ represents a linear partially or fully fluorinated aliphatic group or a linear partially or fully fluorinated aliphatic group interrupted with one or more oxygen atoms, X$^{i+}$ represents a cation having the valence i and i is 1, 2 or 3. (See, e.g. U.S. Pat. Publ. No. 2007/0015864 to Hinzter et al.). Additional examples of suitable emulsifiers also include perfluorinated polyether emulsifiers having the formula $CF_3$—($OCF_2$)$_m$—O—$CF_2$—X, wherein m has a value of 1 to 6 and X represents a carboxylic acid group or salt thereof, and the formula $CF_3$—O($CF_2$)$_3$—($OCF(CF_3)$—$CF_2$)$_z$—O-L-Y wherein z has a value of 0, 1, 2 or 3, L represents a divalent linking group selected from —$CF(CF_3)$—, —$CF_2$—, and —$CF_2CF_2$— and Y represents a carboxylic acid group or salt thereof (See, e.g., U.S. Pat. Publ. No. 2007/0015865 to Hintzer et al.). Other suitable emulsifiers include perfluorinated polyether emulsifiers having the formula $R_f$—O($CF_2CF_2O$)$_m$$CF_2$COOA wherein $R_f$ is $C_nF_{(2n+1)}$; where n is 1 to 4, A is a hydrogen atom, an alkali metal or $NH_4$, and m is an integer of from 1 to 3. (See, e.g., U.S. Pat. No. 2006/0199898 to Funaki; Hiroshi et al.). Suitable emulsifiers also include perfluorinated emulsifiers having the formula F($CF_2$)$_n$O($CF_2CF_2O$)$_m$$CF_2$COOA wherein A is a hydrogen atom, an alkali metal or $NH_4$, n is an integer of from 3 to 10, and m is 0 or an integer of from 1 to 3. (See, e.g. U.S. Pat. Publ. No. 2007/0117915 to Funaki; Hiroshi et al.). Further suitable emulsifiers include fluorinated polyether emulsifiers as described in U.S. Pat. No. 6,429,258 to Morgan et al. and perfluorinated or partially fluorinated alkoxy acids and salts thereof wherein the perfluoroalkyl component of the perfluoroalkoxy has 4 to 12 carbon atoms, or 7 to 12 carbon atoms. (See, e.g. U.S. Pat. No. 4,621,116 to Morgan). Suitable emulsifiers also include partially fluorinated polyether emulsifiers having the formula [$R_f$—(O)$_t$—CHF—($CF_2$)$_n$—COO—]$_i$X$^{i+}$ wherein $R_f$ represents a partially or fully fluorinated aliphatic group optionally interrupted with one or more oxygen atoms, t is 0 or 1 and n is 0 or 1, X$^{i+}$ represents a cation having a valence i and i is 1, 2 or 3. (See, e.g. U.S. Pat. Publ. No. 2007/0142541 to Hintzer et al.). Further suitable emulsifiers include perfluorinated or partially fluorinated ether containing emulsifiers as described in U.S. Pat. Publ. Nos. 2006/0223924 to Tsuda; Nobuhiko et al., 2007/0060699 to Tsuda; Nobuhiko et al, 2007/0142513 to Tsuda; Nobuhiko et al and 2006/0281946 to Morita; Shigeru et al. Fluoroalkyl, for example, perfluoroalkyl, carboxylic acids and salts thereof having 6-20 carbon atoms, such as ammonium perfluorooctanoate (APFO) and ammonium perfluorononanoate. (See, e.g. U.S. Pat. No. 2,559,752 to Berry) may also be useful.

If desired, the emulsifiers can be removed or recycled from the fluoropolymer latex as described in U.S. Pat. No. 5,442,097 to Obermeier et al.; U.S. Pat. No. 6,613,941 to Felix et al.; U.S. Pat. No. 6,794,550 to Hintzer et al.; U.S. Pat. No. 6,706,193 to Burkard et al.; and U.S. Pat. No. 7,018,541 Hintzer et al.

In some embodiments, the polymerization process may be conducted with no emulsifier (e.g., no fluorinated emulsifier). Polymer particles produced without an emulsifier typically have an average diameter, as determined by dynamic light scattering techniques, in a range of about 40 nm to about 500 nm, typically in range of about 100 nm and about 400 nm, and suspension polymerization will typically produce particles sizes up to several millimeters.

In some embodiments, a water soluble initiator can be useful to start the polymerization process. Salts of peroxy sulfuric acid, such as ammonium persulfate, are typically applied either alone or sometimes in the presence of a reducing agent, such as bisulfites or sulfinates (disclosed in U.S. Pat. No. 5,285,002 Grootaert and U.S. Pat. No. 5,378,782 to Grootaert) or the sodium salt of hydroxy methane sulfinic acid (sold under the trade designation "RONGALIT", BASF Chemical Company, New Jersey, USA). Most of these initiators and the emulsifiers have an optimum pH-range where they show most efficiency. For this reason, buffers are sometimes useful. Buffers include phosphate, acetate or carbonate buffers or any other acid or base, such as ammonia or alkali metal hydroxides. The concentration range for the initiators and buffers can vary from 0.01% to 5% by weight based on the aqueous polymerization medium.

Peroxide-curable amorphous fluoropolymers typically include a chloro, bromo-, or iodo-cure site. In some embodiments of the curable compositions disclosed herein, the amorphous fluoropolymer comprises a bromo- or iodo-cure site. In some of these embodiments, the amorphous fluoropolymer comprises an iodo-cure site. The cure site can be an iodo-, bromo-, or chloro-group chemically bonded at the end of a fluoropolymer chain. The weight percent of elemental iodine, bromine, or chlorine in the amorphous fluoropolymer may range from about 0.2 wt. % to about 2 wt. %, and, in some embodiments, from about 0.3 wt. % to about 1 wt. %. To incorporate a cure site end group into the amorphous fluoropolymer, any one of an iodo-chain transfer agent, a bromo-chain transfer agent, or a chloro-chain transfer agent can be used in the polymerization process. For example, suitable iodo-chain transfer agents include perfluoroalkyl or chloroperfluoroalkyl groups having 3 to 12 carbon atoms and one or two iodo-groups. Examples of iodo-perfluorocompounds include 1,3-diiodoperfluoropropane, 1,4-diiodoperfluorobutane, 1,6-diiodoperfluorohexane, 1,8-diiodoperfluorooctane, 1,10-diiodoperfluorodecane, 1,12-diiodoperfluorododecane, 2-iodo-1,2-dichloro-1,1,2-trifluoroethane, 4-iodo-1,2,4-trichloroperfluorobutane and mixtures thereof. Suitable bromo-chain transfer agents include perfluoroalkyl or chloroperfluoroalkyl groups having 3 to 12 carbon atoms and one or two iodo-groups.

Chloro-, bromo-, and iodo-cure site monomers may also be incorporated into the amorphous fluoropolymer by including cure site monomers in the polymerization reaction. Examples of cure site monomers include those of the formula $CX_2=CX(Z)$, wherein each X is independently H or F, and Z is I, Br, or $R_f-Z$, wherein Z is I or Br and $R_f$ is a perfluorinated or partially perfluorinated alkylene group optionally containing O atoms. In addition, non-fluorinated bromo- or iodo-substituted olefins, e.g., vinyl iodide and allyl iodide, can be used. In some embodiments, the cure site monomers is $CH_2=CHI$, $CF_2=CHI$, $CF_2=CFI$, $CH_2=CHCH_2I$, $CF_2=CFCF_2I$, $CH_2=CHCF_2CF_2I$, $CF_2=CFCH_2CH_2I$, $CF_2=CFCF_2CF_2I$, $CH_2=CH(CF_2)_6CH_2CH_2I$, $CF_2=CFOCF_2CF_2I$, $CF_2=CFOCF_2CF_2CF_2I$, $CF_2=CFOCF_2CF_2CH_2I$, $CF_2=CFCF_2OCH_2CH_2I$, $CF_2=CFO(CF_2)_3OCF_2CF_2I$, $CH_2=CHBr$, $CF_2=CHBr$, $CF_2=CFBr$, $CH_2=CHCH_2Br$, $CF_2=CFCF_2Br$, $CH_2=CHCF_2CF_2Br$, $CF_2=CFOCF_2CF_2Br$, $CF_2=CFC_1$, $CF_2=CFCF_2C_1$, or a mixture thereof.

The chain transfer agents having the cure site and/or the cure site monomers can be fed into the reactor by batch charge or continuously feeding. Because feed amount of chain transfer agent and/or cure site monomer is relatively small compared to the monomer feeds, continuous feeding of small amounts of chain transfer agent and/or cure site monomer into the reactor is difficult to control. Continuous feeding can be achieved by a blend of the iodo-chain transfer agent in one or more monomers. Examples of monomers useful for such a blend include hexafluoropropylene (HFP) and perfluoromethyl vinyl ether (PMVE).

Adjusting, for example, the concentration and activity of the initiator, the concentration of each of the reactive monomers, the temperature, the concentration of the chain transfer agent, and the solvent using techniques known in the art can control the molecular weight of the amorphous fluoropolymer. In some embodiments, amphorphous fluoropolymers useful for practicing the present disclosure have weight average molecular weights in a range from 10,000 grams per mole to 200,000 grams per mole. In some embodiments, the weight average molecular weight is at least 15,000, 20,000, 25,000, 30,000, 40,000, or 50,000 grams per mole up to 100,000, 150,000, 160,000, 170,000, 180,000, or up to 190,000 grams per mole. Amorphous fluoropolymers disclosed herein typically have a distribution of molecular weights and compositions. Weight average molecular weights can be measured, for example, by gel permeation chromatography (i.e., size exclusion chromatography) using techniques known to one of skill in the art.

Amorphous fluoropolymers useful for practicing the present disclosure may have a Mooney viscosity in a range from 0.1 to 100 (ML 1+10) at 100° C. according to ASTM D1646-06 TYPE A. In some embodiments, amorphous fluoropolymers useful for practicing the present disclosure have a Mooney viscosity in a range from 0.1 to 20, 0.1 to 10, or 0.1 to 5 (ML 1+10) at 100° C. according to ASTM D1646-06 TYPE A.

To coagulate the obtained fluoropolymer latex, any coagulant which is commonly used for coagulation of a fluoropolymer latex may be used, and it may, for example, be a water soluble salt (e.g., calcium chloride, magnesium chloride, aluminum chloride or aluminum nitrate), an acid (e.g., nitric acid, hydrochloric acid or sulfuric acid), or a water-soluble organic liquid (e.g., alcohol or acetone). The amount of the coagulant to be added may be in range of 0.001 to 20 parts by mass, for example, in a range of 0.01 to 10 parts by mass per 100 parts by mass of the fluorinated elastomer latex. Alternatively or additionally, the fluorinated elastomer latex may be frozen for coagulation.

The coagulated amorphous fluoropolymer can be collected by filtration and washed with water. The washing water may, for example, be ion exchanged water, pure water, or ultrapure water. The amount of the washing water may be from 1 to 5 times by mass to the amorphous fluoropolymer, whereby the amount of the emulsifier attached to the amorphous fluoropolymer can be sufficiently reduced by one washing.

Curable compositions according to the present disclosure can be prepared by compounding the solvent, amorphous fluoropolymer, peroxide, and optionally the crosslinker described above. Compounding can be carried out, for example, on a roll mill (e.g., two-roll mill), internal mixer (e.g., Banbury mixers), or other rubber-mixing device. Thorough mixing is typically desirable to distribute the components and additives uniformly throughout the curable composition so that it can cure effectively. The compounding can be carried out in one or several steps. For example, certain components such as the crosslinker may be compounded into a mixture of the amorphous fluoropolymer, solvent, and peroxide just before use. Also the solvent may be compounded into a mixture of the amorphous fluoropolymer, peroxide, and optionally crosslinker in a second step. It is typically desirable that the temperature of the composition during mixing should not rise high enough to initiate curing. For example, the temperature of the composition may be kept at or below about 50° C.

Curable compositions according to the present disclosure can also be made by combining the solvent, amorphous fluoropolymer, peroxide, and optionally the crosslinker described above and shaking or stirring the mixture, if necessary, until a solution is formed. The amount of solvent may be in excess of 39% by weight versus the weight of the composition. In such instances, the solvent may be removed by heat and/or reduced pressure until the curable composition disclosed herein is achieved.

In some embodiments, curable compositions according to the present disclosure have an unexpectedly low viscosity in view of the high weight percentage of amorphous peroxide-curable fluoropolymer in the composition. In some embodiments, the curable composition has a viscosity at 25° C. in a range from 100 poise to 24,000 poise. In some embodiments, the curable composition has a viscosity at 25° C. in a range from 1,000 poise to 10,000 poise. Viscosities in these ranges allow the curable composition to be used easily, for example, as a caulk. Unexpectedly low viscosities for the curable compositions according to the present disclosure are shown in the Examples, below. For example, curable compositions of Examples 1 and 2, which included 75% by weight amorphous fluoropolymer and 21% by weight butyl acetate, had viscosities 1,800 and 2,217 poise, respectively. Curable compositions of Examples 3 to 10, which included 80% by weight amorphous fluoropolymer and 16% by weight of solvents including DMC, methyl acetate, tert-butyl acetate, acetone, ethyl acetate, butyl acetate, MEK, and MIBK ranged in viscosities from 1,109 poise to 5,682 poise. Furthermore, for curable compositions having the amorphous fluoropolymer in a range from greater than 80 percent by weight to 97.5 percent by weight versus the weight of the curable composition, the compositions have viscosities at 25° C. in a range from 4500 poise to 24,000 poise, depending on the solvent. In methyl acetate and ethyl acetate, curable compositions having at least 90% amorphous fluoropolymer by weight, versus the weight of the curable compositions can have viscosities of less than 15,000 poise.

In many embodiments, curable compositions according to the present disclosure have an unexpected ability to cure in view of the solvent present in the curable composition. The curing of an amorphous fluoropolymer can be evaluated on a sealed torsion shear rotorless curemeter in accordance with ASTM D 5289-07 by measuring delta torque or tan delta. Delta torque is the difference between maximum torque and minimum torque, and it is related to crosslink density of cured fluoroelastomer. A higher delta torque indicates the fluoroelastomer has more crosslinking or a higher crosslink density. Tan delta is calculated from the loss modulus (G") divided by the storage modulus (G') (tan δ=G"/G'). A higher tan delta indicates the fluoroelastomer is more fluid, and a lower tan delta indicates the fluoroelastomer is more elastic. In some embodiments, curable compositions disclosed herein have a delta torque at 130° C. for 12 minutes of at least 0.4 dNm or 0.5 dNm as measured by a sealed torsion shear rotorless curemeter in accordance with ASTM D 5289-07. In some embodiments, the delta torque at 130° C. for 12 minutes is at least 1.0 dNm or at least 2.0 dNm. In some embodiments, curable compositions disclosed herein have a tan delta after 12 minutes at 130° C. of less than 0.3 as measured by a sealed torsion shear rotorless curemeter in accordance with ASTM D 5289-07. In some embodiments, the tan delta after 12 minutes at 130° C. is less than 0.2 or 0.1. It is unexpected that curable compositions according to the present disclosure exhibit cure at 130° C. as measured by a sealed torsion shear rotorless curemeter in view of Illustrative Examples 5 and 10, which include 50% by weight fluoropolymer and greater than 40% by weight solvent versus the weight of the composition.

In many embodiments, curable compositions according to the present disclosure also have good shelf stability. For example, as shown in Example 11, below, a curable composition was still fluid after 314 days at room temperature and was still readily cured at 130° C. as measured by a sealed torsion shear rotorless curemeter in accordance with ASTM D 5289-07. Thus, in many embodiments, the curable compositions according to the present disclosure are shelf stable and yet unexpectedly curable at or above peroxide-decomposition temperatures.

The curable composition according to the present disclosure can be used to make cured fluoroelastomers in the form of a variety of articles, including final articles, such as O-rings, and/or preforms from which a final shape is made, (e.g. a tube from which a ring is cut). To form an article, the curable composition can be extruded using a screw type extruder or a piston extruder. The extruded or pre-formed curable compositions can be cured in an oven at ambient pressure.

Alternatively, the curable composition can be shaped into an article using injection molding, transfer molding, or compression molding. Injection molding of the curable composition, for example, can be carried out by masticating the curable composition in an extruder screw and collecting it in a heated chamber from which it is injected into a hollow mold cavity by means of a hydraulic piston. After vulcanization the article can then be demolded. Advantages of injection molding process include short molding cycles, little or no preform preparation, little or no flash to remove, and low scrap rate. Since the viscosity of the curable composition is relatively low, the cylinder, barrel and screw temperature can be low, and the fill or injection time can be minimized.

The curable composition according to the present disclosure can also be used to prepare cure-in-place gaskets (CIPG) or form-in-place gaskets (FIPG). A bead or thread of the curable composition can be deposited from a nozzle onto a substrate's surface. After forming to a desired gasket pattern, the curable composition may be cured in place with heat, for example, in an oven at ambient pressure.

The curable composition according to the present disclosure can also be useful as a fluoroelastomer caulk, which can be useful, for example, to fill voids in, coat, adhere to, seal, and protect various substrates from chemical permeation, corrosion, and abrasion, for example. Fluoroelastomer caulk can be useful as a joint sealant for steel or concrete containers, seals for flue duct expansion joints, door gaskets sealants for industrial ovens, fuel cell sealants or gaskets, and adhesives for bonding fluoroelastomer gaskets (e.g., to metal). In some embodiments, the curable composition can be dispensed by hand and cured with heat at ambient pressure.

In some embodiments of the method of making a cured fluoroelastomer according to the present disclosure, the curable composition is positioned on a substrate before heating the curable composition at a cure temperature.

For any of the above embodiments of curable compositions, the cure temperature can be selected based on the decomposition temperature of the peroxide. For example, a temperature can be selected that is above (in some embodiments, at least 10° C., 20° C., 30° C., 40° C., or at least 50° C. above) the ten-hour half-life temperature of the peroxide. In some embodiments, the cure temperature is above 100° C. In some embodiments, the cure temperature is in a range from 120° C. to 180° C. The cure time can be at least 5, 10, 15, 20, or 30 minutes up to 24 hours, depending on the composition of the peroxide-curable, amorphous fluoropolymer and the cross-sectional thickness of the cured fluoroelastomer.

Conveniently, because the curable composition according to the present disclosure is unexpectedly curable even with the solvent present, a solvent removal step is not necessary before curing the curable composition to make a cured fluoroelastomer. Accordingly, in some embodiments of the method of making a cured fluoroelastomer according to the present disclosure, heating the curable composition at a cure temperature is carried out without first removing the solvent. In many solvent-cast fluoroelastomer coatings, a drying step precedes the curing step. This step can add time and cost to a process. Such a drying step is typically carried out at a temperature below the ten-hour half-life temperature of the peroxide. For example, the drying can carried out at a temperature of at least 20° C., 25° C., or 30° C. below the ten-hour half-life temperature of the peroxide. Therefore, in some embodiments of the method of making a cured fluoroelastomer according to the present disclosure, heating the curable compositions at two distinct temperatures and/or heating the curable composition at a temperature below the ten-hour half-life temperature of the peroxide is avoided.

In some embodiments, the cured fluoroelastomer prepared by the method disclosed herein contains solvent. Because of the compatibility of the solvent with the cured fluoroelastomer and because of the low ozone impact of the solvent in some embodiments of the curable composition and cured fluoroelastomer made from the curable composition, residual solvent in the cured fluoroelastomer need not be removed before use. On the other hand, in some embodiments of the method of making a cured fluoroelastomer disclosed herein, the cured fluoroelastomer is post-cured at a temperature sufficient to remove the solvent. The cured fluoroelastomer can be post-cured, for example, in an oven at a temperature of about 120° C. to 300° C., in some embodiments, at a temperature of about 150° C. to 250° C., for a period of about 30 minutes to about 24 hours or more, depending on the chemical composition of the fluoroelastomer and the cross-sectional thickness of the sample.

Additives such as carbon black, stabilizers, plasticizers, lubricants, fillers, and processing aids typically utilized in fluoropolymer compounding can be incorporated into the curing compositions, provided they have adequate stability for the intended service conditions. In particular, low temperature performance can be enhanced by incorporation of perfluoropolyethers. See, for example, U.S. Pat. No. 5,268,405 to Ojakaar et al. Carbon black fillers can be employed in fluoropolymers as a means to balance modulus, tensile strength, elongation, hardness, abrasion resistance, conductivity, and processability of the compositions. Suitable examples include MT blacks (medium thermal black) and large particle size furnace blacks. When used, 1 to 100 parts filler per hundred parts fluoropolymer (phr) of large size particle black is generally sufficient.

Fluoropolymer fillers may also be present in the curable compositions. Generally, from 1 to 100 phr of fluoropolymer filler is used. The fluoropolymer filler can be finely divided and easily dispersed as a solid at the highest temperature used in fabrication and curing of the curable composition. By solid, it is meant that the filler material, if partially crystalline, will have a crystalline melting temperature above the processing temperature(s) of the curable composition(s). One way to incorporate fluoropolymer filler is by blending latices. This procedure, using various kinds of fluoropolymer filler, is described in U.S. Pat. No. 6,720,360 to Grootaert et al.

Alternatively, in some embodiments, including any of the embodiments of the curable composition disclosed herein, the curable composition according to the present disclosure is free of fillers or contains less than 5%, 2%, or 1% by weight fillers versus the weight of the curable composition. For example, the curable composition according to the present disclosure can be free of inorganic fillers. One advantage to avoiding fillers in the curable compositions disclosed herein is that visible light transmissive cured fluoroelastomers may be obtained. In part because of the compatibility of the solvent with the cured fluoroelastomer, the cured fluoroelastomer prepared from the curable composition disclosed herein can have relatively high visible and infrared light transmission. In some embodiments, the cured fluoroelastomer prepared by the method disclosed herein has an average visible light transmission of at least about 70 percent (in some embodiments, at least about 75 or 80 percent). In some embodiments, the cured fluoroelastomer prepared by the method disclosed herein has an average transmission over a range of 360 nm to 1100 nm of at least about 70 percent (in some embodiments, at least about 75 or 80 percent). Even in embodiments in which the cured fluoroelastomer does not incorporate a filler, useful mechanical properties are obtained. See, for example, Example 34, below.

Conventional adjuvants may also be incorporated into the curable composition disclosed herein to enhance the properties of the compound. For example, acid acceptors may be employed to facilitate the cure and thermal stability of the compound. Suitable acid acceptors may include magnesium oxide, lead oxide, calcium oxide, calcium hydroxide, dibasic lead phosphite, zinc oxide, barium carbonate, strontium hydroxide, calcium carbonate, hydrotalcite, alkali stearates, magnesium oxalate, or combinations thereof. The acid acceptors can be used in amounts ranging from about 1 to about 20 parts per 100 parts by weight of the amorphous fluoropolymer. However, some applications like fuel cell sealants or gaskets need low metal content because metal ion will deteriorate the proton exchange membrane performance of fuel cell. Accordingly, in some embodiments, the curable composition is free of such adjuvants or includes less than 0.5% by weight of such adjuvants versus the weight of the curable composition. Furthermore, in some embodiments, including any of the aforementioned embodiments of the curable composition, the curable composition is free of silanes or includes less than 1% or less than 0.5% of a silane. Such silanes include aminosilanes or Schiff bases derived from aminosilanes. Despite the lack of such adjuvants in some embodiments, desirable curing characteristics are observed for the curable compositions as discussed above and shown in the Examples, below.

Some Embodiments of the Disclosure

In a first embodiment, the present disclosure provides a curable composition comprising: an amorphous, peroxide-curable fluoropolymer having a first solubility parameter, wherein the amorphous, peroxide-curable fluoropolymer is present from 60 percent to 97.5 percent by weight versus the weight of the curable composition,
a solvent having a second solubility parameter, wherein the solvent is present from 1 percent to 39 percent by weight versus the weight of the curable composition, and a peroxide,
wherein the absolute value of the first solubility parameter minus the second solubility parameter is less than or equal to 8.2 $(MPa)^{1/2}$.

In a second embodiment, the present disclosure provides the curable composition of the first embodiment, wherein the absolute value of the first solubility parameter minus the second solubility parameter is less than or equal to 4.1 $(MPa)^{1/2}$.

In a third embodiment, the present disclosure provides a curable composition comprising: an amorphous, peroxide-curable fluoropolymer, wherein the amorphous, peroxide-curable fluoropolymer is present from 60 percent to 97.5 percent by weight versus the weight of the curable composition, a solvent having a solubility parameter in a range from 9.6 (MPa)$^{1/2}$ to 26 (MPa)$^{1/2}$, wherein the solvent is present from 1 percent to 39 percent by weight versus the weight of the curable composition, and a peroxide.

In a fourth embodiment, the present disclosure provides the curable composition of the third embodiment, wherein the solubility parameter of the solvent is in a range from 13.7 (MPa)$^{1/2}$ to 21.9 (MPa)$^{1/2}$.

In a fifth embodiment, the present disclosure provides the curing composition of any one of the first to fourth embodiments, wherein the amorphous peroxide-curable fluoropolymer is not present at 80 percent by weight versus the weight of the curable composition.

In a sixth embodiment, the present disclosure provides the curable composition of any one of the first to fifth embodiments, wherein the amorphous peroxide-curable fluoropolymer is present in a range from 60 percent by weight to less than 80 percent by weight versus the weight of the curable composition.

In a seventh embodiment, the present disclosure provides the curable composition any one of the first to fifth embodiments, wherein the amorphous peroxide-curable fluoropolymer is present in a range from greater than 80 percent by weight to 97.5 percent by weight versus the weight of the curable composition.

In an eighth embodiment, the present disclosure provides the curable composition of any one of the first to seventh embodiments, further comprising a crosslinker.

In a ninth embodiment, the present disclosure provides the curable composition of the first to eighth embodiment, wherein the crosslinker is tri(methyl)allyl isocyanurate, triallyl isocyanurate, tri(methyl)allyl cyanurate, poly-triallyl isocyanurate, xylylene-bis(diallyl isocyanurate), N,N'-m-phenylene bismaleimide, diallyl phthalate, tris(diallylamine)-s-triazine, triallyl phosphite, 1,2-polybutadiene, ethyleneglycol diacrylate, diethyleneglycol diacrylate, or $CH_2=CH-R_f-CH=CH_2$ wherein $R_f$ is a perfluoroalkylene having from 1 to 8 carbon atoms.

In a tenth embodiment, the present disclosure provides the curable composition of the eighth or ninth embodiment, wherein the crosslinker is present in the curable composition in a range from 1 percent to 10 percent by weight.

In an eleventh embodiment, the present disclosure provides the curable composition of any one of the first to tenth embodiments, wherein the amorphous, peroxide-curable fluoropolymer comprises a bromo- or iodo-cure site.

In a twelfth embodiment, the present disclosure provides the curable composition of the eleventh embodiment, wherein the amorphous, peroxide-curable fluoropolymer comprises an iodo-cure site.

In a thirteenth embodiment, the present disclosure provides the curable composition of any one of the first to the twelfth embodiments, wherein the curable composition has a viscosity at 25° C. in a range from 100 poise to 24,000 poise.

In a fourteenth embodiment, the present disclosure provides the curable composition of any one of the first to thirteenth embodiments, wherein the curable composition has a viscosity at 25° C. in a range from 1,000 poise to 10,000 poise.

In a fifteenth embodiment, the present disclosure provides the curable composition of any one of the first to fourteenth embodiments, wherein the peroxide is an acyl peroxide.

In a sixteenth embodiment, the present disclosure provides the curable composition of any one of the first to fifteenth embodiments, wherein the peroxide is a diacyl peroxide.

In a seventeenth embodiment, the present disclosure provides the curable composition of any one of the first to sixteenth embodiments, wherein the peroxide is present in the curable composition in a range from 0.5 percent to 10 percent by weight.

In an eighteenth embodiment, the present disclosure provides the curable composition of any one of the first to seventeenth embodiments, wherein the solvent has a boiling point in a range from 30° C. to 200° C.

In a nineteenth embodiment, the present disclosure provides the curable composition of any one of the first to eighteenth embodiments, having a delta torque at 130° C. for 12 minutes greater than 0.5 dNm as measured by a sealed torsion shear rotorless curemeter in accordance with ASTM D 5289-07.

In a twentieth embodiment, the present disclosure provides the curable composition of any one of the first to nineteenth embodiments, having a tan delta after 12 minutes at 130° C. of less than 0.3 as measured by a sealed torsion shear rotorless curemeter in accordance with ASTM D 5289-07.

In a twenty-first embodiment, the present disclosure provides the curable composition of any one of the first to twentieth embodiments, wherein the solvent comprises at least one of acetone, 2-butanone, 4-methyl-2-pentanone, cyclohexanone, methyl formate, ethyl formate, methyl acetate, ethyl acetate, n-butyl acetate, tert-butyl acetate, or dimethyl carbonate.

In a twenty-second embodiment, the present disclosure provides the curable composition of the twenty-first embodiment, wherein the solvent is ethyl acetate or methyl acetate.

In a twenty-third embodiment, the present disclosure provides the curable composition of any one of the first to twenty-first embodiments, wherein the solvent has a calculated ozone impact of up to 0.35 on the maximum incremental reactivity scale measured in units of grams of ozone per grams of solvent. In a twenty-fourth embodiment, the present disclosure provides a method of making a cured fluoroelastomer, the method comprising:

providing the curable composition of any one of the first to twenty-third embodiments, and heating the curable composition at a cure temperature to make the cured fluoroelastomer.

In a twenty-fifth embodiment, the present disclosure provides the method of the twenty-fourth embodiment, wherein the method does not include first removing the solvent before heating the curable composition.

In a twenty-sixth embodiment, the present disclosure provides the method of the twenty-fourth or twenty-fifth embodiment, wherein the cure temperature is above 100° C.

In a twenty-seventh embodiment, the present disclosure provides the method of any one of the twenty-fourth to twenty-sixth embodiments, wherein the cure temperature is at least the ten-hour half-life temperature of the peroxide.

In a twenty-eighth embodiment, the present disclosure provides the method of any one of the twenty-fourth to twenty-seventh embodiments, wherein the curable composition is positioned on a substrate before heating the curable composition.

In a twenty-ninth embodiment, the present disclosure provides the method of any one of the twenty-fourth to twenty-eighth embodiments, wherein the cured fluoroelastomer has an average light transmission in a range from 360 nanometers to 1100 nanometers of at least 70 percent.

In a thirtieth embodiment, the present disclosure provides the method of any one of the twenty-fourth to twenty-ninth embodiments, wherein the cured fluoroelastomer includes solvent.

In a thirty-first embodiment, the present disclosure provides a cured fluoroelastomer made by the method of any one of the twenty-fourth to thirtieth embodiments.

The following specific, but non-limiting, examples will serve to illustrate the present disclosure. In these examples, all amounts are expressed in parts by weight, or parts by weight per one hundred parts by weight of rubber (phr). Abbreviations include g for grams, min for minutes, hrs for hours, rpm for revolutions per minute.

EXAMPLES

Test Methods
Mooney Viscosity

Polymer Mooney viscosity was determined in accordance with ASTM D1646-06 TYPE A by a MV 2000 instrument (available from Alpha Technologies, Akron, Ohio, USA) using large rotor with one minute preheat and 10 minutes measurement (ML 1+10) at 100° C. Results are reported in Mooney units.

Solution DMA Viscosity

The polymer solvent solution viscosity was measured using a dynamic mechanical analyzer (DMA), RPA 2000 instrument (available from Alpha Technologies, Akron, Ohio, USA) in accordance with ASTM D 6204-07. The apparent viscosity was measured at 1.0% strain and the frequency ($\omega$) of 0.2-200 rad/sec. The temperature for these measurements was 25° C. 5 g to 7 g of the solution was placed on a polyester terephthalte (PET) film and the solution was cooled in a freezer box at −40° C. for 10 min to increase the initial viscosity for preventing overflow of the sample when the sample was pressed between the dies.

Solution Brookfield Viscosity

The polymer solvent solution viscosity was measured with a Brookfield viscometer DV-II (available from Brookfield Engineering Laboratories, Inc., Middleboro, Mass., USA) in accordance with ASTM D 2196-05. The LV4 spindle was used at 0.3 rpm.

Cure Rheology

The cure characteristics were measured using a RPA 2000 instrument (available from Alpha Technologies, Akron, Ohio, USA) with Moving Die Rheometer (MDR, a sealed torsion shear rotorless curemeter) mode under conditions corresponding to ASTM D5289-07. The frequency was 100 cpm (10.47 rad/s) and the strain was 0.5 degree (6.98%). The following parameters were recorded:

ML: minimum torque level in unit of dNm
MH: maximum torque level in unit of dNm
delta torque: difference between maximum torque (MH) and minimum torque (ML)
ts2: minutes to 2 dNm rise
t'50: minutes to 50% of delta torque (50% cure time)
t'90: minutes to 90% of delta torque (90% cure time)

After the MDR test, tan delta was measured at the same frequency, strain and temperature. After the test, the molded sample was transparent.

Mechanical Properties

Tensile strength at break and elongation at break were measured using a T2000 tensometer (available from Alpha Technologies, Akron, Ohio, USA) in accordance with ASTM D 412-06a. The dumbbells for mechanical properties were cut with ASTM Die D.

Amorphous Fluoropolymer A-D Preparation

Amorphous Fluororpolymer A was prepared as follows. An 80 liter reactor was charged with 52 kg water, 40 g ammonium persulfate (APS, $(NH_4)_2S_2O_8$) and 160 g of a 50% aqueous solution of potassium phosphate dibasic ($K_2HPO_4$). The reactor was evacuated, the vacuum was broken and it was pressurized to 25 psi (0.17 MPa). This vacuum and pressurization was repeated three times. After removing oxygen, the reactor was heated to 80° C. and pressurized to 74 psi (0.51 MPa) with a blend of hexafluoropropylene (HFP) 1,4-diiodooctafluorobutane and 2-trifluoromethyl-3-ethoxydodecafluorohexane (commercially available from 3M Company, St. Paul, Minn. under the trade designation "NOVEC HFE-7500"). To prepare the blend of hexafluoropropylene (HFP), 1,4-diiodooctafluorobutane and "NOVEC HFE 7500", a 1-liter, stainless steel cylinder was evacuated and purged 3 times with $N_2$. After adding 1,4-diiodooctafluorobutane and "NOVEC HFE 7500", to the cylinder, HFP was added based on the amount of 1,4-diiodooctafluorobutane added. The blend was then attached to the reactor and was fed using a blanket of $N_2$. The blend contained 89.9 wt % of HFP and variable wt % amounts of 1,4-diiodooctafluorobutane and "NOVEC HFE 7500" according to Table 1 for Amorphous Fluoropolymers A-D. The reactor was then charged with vinylidene fluoride (VDF) and the above described blend of hexafluoropropylene (HFP), 1,4-diiodooctafluorobutane and "NOVEC HFE 7500", bringing reactor pressure to 220 psi (1.52 MPa). Total precharge of VDF and the blend of HFP, 1,4-diiodooctafluorobutane and "NOVEC HFE 7500" was 800 g, and 1536 g, respectively. The reactor was agitated at 450 rpm. As reactor pressure dropped due to monomer consumption in the polymerization reaction, the blend of hexafluoropropylene (HFP), 1,4-diiodooctafluorobutane and "NOVEC HFE 7500" and VDF was continuously fed to the reactor to maintain the pressure at 220 psi (1.52 MPa). The ratio of the blend and VDF was 0.651 by weight and no emulsifier was used for the polymerization. After 6.2 hrs the monomer and blend feeds were discontinued and the reactor was cooled. The resulting dispersion had a solid content of 29.7 wt. % and a pH of 3.6. The dispersion particle size was 323 nm and the total amount of dispersion was about 76.5 kg.

For the purpose of coagulation, 19.54 g of a mixture of 1 part by weight of $NH_4OH$ and 25 parts by weight of deionized water was added to 942 g of the latex made as described above. The pH of the mixture was 6.7. This mixture was added to 2320 mL of a 5 wt % $MgCl_2$ in water solution. The crumb was recovered by filtering the coagulate through cheese cloth and gently squeezing to remove excess water. The crumb was returned to the coagulation vessel and rinsed with deionized water a total of 3 times. After the final rinse and filtration, the crumb was dried in a 130° C. oven for 16 hrs. Mooney viscosity was measured as described under "Mooney Viscosity", above. Iodine and bromine content were measured by neutron activation analysis (NAA). The Mooney viscosity and iodine and bromine content are shown in Table 1.

Amorphous Fluoropolymer E

Amorphous Fluoropolymer E is commercially available as "E-18894" from 3M Company. The fluoropolymer has a 36 Mooney viscosity measured at 100° C., is a terpolymer of tetrafluoroethylene (TFE), hexafluoropropylene (HFP) and vinylidene fluoride (VDF), and is 65.7% of fluorine by weight.

TABLE 1

| Amorphous Fluoropolymer | 1,4-diiodooctafluorobutane and NOVEC HFE 7500 (wt. %) in the blend (same wt. % of each) | Mooney Viscosity @ 100° C. | Iodine content (wt %) | Bromine content (wt %) |
|---|---|---|---|---|
| A | 2.2 | 2.1 | 0.58 | none |
| B | 3.7 | 0.1 | 1.0 | none |
| C | 1.0 | 20.6 | 0.26 | none |
| D | 2.0 | 3.0 | 0.53 | none |
| E | N/A | 36 | 0.15 | 0.36 |

Example 1

A curable composition was prepared using a 15 cm (6 inch) two roll mill by compounding Amorphous Fluoropolymer A prepared as described under "Amorphous Fluoropolymer A-D preparation" with 2 phr of benzoyl peroxide (BPO, available under the trade designation "LUPEROX A98" from Aldrich, Milwaukee, Wis.). Then a 75% solution by weight was made by dissolving 20.4 g of the compounded Amorphous Fluoropolymer A and BPO in 5.68 g of butyl acetate with 0.6 g of triallylisocyanurate (TAIC) co-agent (98%, obtained under the trade designation "TAIC" from Nippon Kasei, Japan) in a glass jar. The glass jar was shaken on a shaker for 16 hrs and the polymer was dissolved. The solution formulation is summarized in Table 2 based on parts per hundred rubber (phr). The solution viscosity was measured as described under "Solution DMA Viscosity" and the viscosity of the solution at 25° C. and 200 rad/s was 1,800 poise. The sample was cured as described under "Cure Rheology". Results are shown in Table 3.

cure was too fast, and the samples failed to flow into the cavity of the die of the curemeter.

TABLE 2

| Formulation (phr) | Example 1 | Example 2 | Illustrative Ex 1 |
|---|---|---|---|
| Amorphous Fluoropolymer A | 100 | 100 | 100 |
| TAIC | 3 | 3 | 3 |
| Butyl acetate | 28.4 | 28.4 | 28.4 |
| Benzoyl peroxide (BPO) | 2 | 0 | 0 |
| 2,4-diclhlorbenzoyl peroxide (CBPO) | 0 | 2 | 0 |
| 2,5-diemthyl-2,5-di(t-butylperoxy)-hexane (DBPH) | 0 | 0 | 2 |
| Polymer wt % | 75 | 75 | 75 |

TABLE 3

| | | Solution Viscosity @ 200 rad/s | Cure Rheology MDR | | | | | |
|---|---|---|---|---|---|---|---|---|
| | | | Delta Torque (dNm) | | | Tan Delta | | |
| Example | Peroxide | (poise) | 130° C. | 150° C. | 177° C. | 130° C. | 150° C. | 177° C. |
| EX1 | BPO | 1,800 | 1.7 | 1.6 | 1.5 | 0.069 | 0.063 | 0.034 |
| EX2 | CBPO | 2,217 | 0.5 | NA | NA | 0.068 | NA | NA |
| IE1 | DBPH | 1,639 | 0.0 | 0.3 | 0.6 | 5.330 | 0.179 | 0.318 |

Example (EX) 2 and Illustrative Example (IE) 1

The curable compositions of Example 2 and Illustrative Example 1 were prepared and tested according to the methods of Example 1 except the peroxides in Table 2 were used instead of benzoyl peroxide (BPO). The 2,4-dichlorobenzoyl peroxide (CBPO) is available from 3B Scientific Corp., Libertyville, Ill., and 2,5-dimethyl-2,5-di(t-butylperoxy)-hexane (DBPH) is available under the trade designation "LUPEROX 101" from Aldrich, Milwaukee, Wis. The solution viscosities were measured as described under "Solution DMA Viscosity", and the samples were cured as described under "Cure Rheology". Results are shown in Table 3 and indicate significantly improved cure when using benzoyl peroxide (BPO). In Example 2 the samples were cured at 150° C. and 177° C., but the cure rheology data at 150° C. and 177° C. are not provided in Table 3 because the Examples 3-10 and Illustrative Examples 2-4

The curable compositions of Examples 3-10 and Illustrative Examples 2-4 were prepared and tested according to the methods of Example 1 except various solvents as shown in Table 4 were used and the fluoropolymer content was 80% by weight.

The amorphous fluoropolymer was completely dissolved in the solvents, and the results are summarized in Table 4. The "Solution DMA Viscosity" and the "Solution Brookfield Viscosity" of Example 8 (solvent: butyl acetate) was measured at various temperatures from 25° C. to 40° C. and the results are summarized in Table 5. DMA viscosity (n') was measured at 200 rad/s with 1% strain and Brookfield viscosity was measured at 0.3 rpm using LV4 spindle.

TABLE 4

| Example | Solvent | Solvent Boiling point (° C.) | Solvent Solubility parameter (MPa$^{1/2}$) | Polymer % | Solution Viscosity @ 200 rad/s (poise) | Cure Rheology @ 130° C. Delta Torque (dNm) | Cure Rheology @ 130° C. Tan Delta |
|---|---|---|---|---|---|---|---|
| EX3 | DMC | 90 | 20.3 | 80 | 4,213 | 4.5 | 0.065 |
| EX4 | MA | 57 | 20.9 | 80 | 1,719 | 4.1 | 0.085 |
| EX5 | TBA | 98 | 15.8 | 80 | 4,102 | 3.1 | 0.055 |
| EX6 | Acetone | 56 | 20.5 | 80 | 1,109 | 3.0 | 0.081 |
| EX7 | EA | 77 | 18.6 | 80 | 3,714 | 5.8 | 0.069 |
| EX8 | BA | 126 | 17.4 | 80 | 5,682 | 3.1 | 0.136 |
| EX9 | MEK | 80 | 19.0 | 80 | 1,311 | 0.7 | 0.096 |
| EX10 | MIBK | 117 | 17.2 | 80 | 2,025 | 1.3 | 0.091 |
| IE2 | methanol | 65 | 29.7 | 80 | 4,269 | 0.3 | 0.344 |
| IE3 | ethanol | 78 | 26.1 | 80 | N/D | NT | NT |
| IE4 | IPA | 82 | 23.5 | 80 | N/D | NT | NT |

DMC = dimethyl carbonate,
MA = methyl acetate,
TBA = tert-butyl acetate,
EA = ethyl acetate,
BA = butyl acetate,
MEK = 2-butanone,
MIBK = 4-methyl-2-pentanone,
IPA = 2-propanol,
N/D = not dissolved,
NT = not tested

TABLE 5

| | Example 8 | | | | | | |
|---|---|---|---|---|---|---|---|
| | 25° C. | 26° C. | 28° C. | 30° C. | 35° C. | 36° C. | 40° C. |
| DMA Viscosity | 2131 | NT | NT | 1441 | 1125 | NT | 844 |
| Brookfield Viscosity | 1140 | 960 | 820 | NT | NT | 780 | 600 |

NT = not tested

Example 11

The curable composition of Example 11 was prepared and tested according to the methods of Example 1 except the fluoropolymer content (%) was 60. The sample was cured as described under "Cure Rheology". Also "Cure Rheology" was measured again after 314 days for the same curable composition stored at room temperature in a jar. The results are shown in Table 6.

TABLE 6

| Example | Solvent | Polymer % | Solution Viscosity @ 200 rad/s (poise) | Cure Rheology @ 130° C. Delta Torque (dNm) | Cure Rheology @ 130° C. Tan Delta |
|---|---|---|---|---|---|
| IE5 | BA | 50 | N/A | 0.0 | — |
| EX11 | BA | 60 | 332 | 0.4 | 0.147 |
| EX11 | BA | 60 | N/A | 0.4* | 0.225* |
| EX12 | BA | 65 | 554 | 0.4 | 0.188 |
| EX13 | BA | 70 | 721 | 1.0 | 0.082 |
| EX14 | BA | 75 | 1,800 | 2.7 | 0.069 |
| EX8 | BA | 80 | 5,682 | 3.1 | 0.136 |
| EX15 | BA | 85 | 10,700 | 2.5 | 0.124 |
| EX16 | BA | 90 | 20,120 | 7.1 | 0.049 |
| EX17 | BA | 95 | 23,950 | 10.5 | 0.045 |
| EX4 | MA | 80 | 1,719 | 4.1 | 0.085 |
| EX18 | MA | 85 | 5,100 | 5.7 | 0.094 |
| EX19 | MA | 90 | 8,371 | 7.4 | 0.056 |
| IE6 | None | 100 | 25,330 | 11.1 | 0.047 |

*Measured after 314 days at room temperature
BA = butyl acetate,
MA = methyl acetate.
NA = not available

Examples 12-17 and Illustrative Examples 5-8

The curable compositions of Examples 12-15 and Illustrative Examples 5-8 were prepared and tested according to the methods of Example 1 except the fluoropolymer contents (%) were different. The curable compositions of Examples 16 and 17 were prepared and tested according to the methods of Example 4 except the fluoropolymer contents (%) were different. The results are summarized in Table 6.

The solution viscosity increases as the fluoropolymer content increases (Table 7). When the fluoropolymer content is lower than 60% (Illustrative Example 5), it is difficult to cure. Viscosity was measured by DMA at 25° C. and 200 rad/sec. with 1.0% strain.

TABLE 7

| Polymer (wt %) | Solvent BA | Solvent MA |
|---|---|---|
| 50 | NA | NT |
| 60 | 332 | NT |
| 65 | 554 | NT |
| 70 | 721 | NT |
| 75 | 1,800 | NT |
| 80 | 5,682 | 1719 |
| 85 | 10,700 | 5100 |
| 90 | 20,120 | 8371 |
| 95 | 23,950 | NT |
| 100 | 25,330 | |

NT = not tested,
NA = not available

Examples 20-28 and Illustrative Examples 7-9

The curable compositions of Examples 20-28 and Illustrative Examples 7-9 were prepared and tested according to the methods of Example 1 except the amounts of benzoyl peroxide (BPO) and co-agent TAIC were different. The results are summarized in Table 8.

TABLE 8

| Example | Solvent | Polymer % | Peroxide BPO (%) | Coagent TAIC (phr) | Solution Viscosity @ 200 rad/s (poise) | Cure Rheology @ 130° C. Delta Torque (dNm) | Cure Rheology @ 130° C. Tan Delta |
|---|---|---|---|---|---|---|---|
| EX20 | BA | 75 | 0.5 | 3 | 1,406 | 0.7 | 0.164 |
| EX21 | BA | 75 | 1 | 3 | 1,441 | 1.4 | 0.081 |
| EX1 | BA | 75 | 2 | 3 | 1,800 | 2.7 | 0.069 |
| EX22 | BA | 75 | 3 | 3 | 1,719 | 1.8 | 0.065 |
| EX23 | BA | 75 | 5 | 3 | 1,856 | 1.4 | 0.062 |
| EX24 | BA | 75 | 10 | 3 | 4,331 | 1.8 | 0.061 |
| IE7 | BA | 75 | 0.2 | 3 | 1,238 | 0.1 | 0.500 |
| EX25 | BA | 75 | 2 | 1 | 1,552 | 0.4 | 0.124 |
| EX26 | BA | 75 | 2 | 2 | 1,719 | 0.9 | 0.082 |
| EX1 | BA | 75 | 2 | 3 | 1,800 | 2.7 | 0.069 |
| EX27 | BA | 75 | 2 | 5 | 1,585 | 2.8 | 0.079 |
| EX28 | BA | 75 | 2 | 10 | 2,107 | 4.2 | 0.092 |
| IE8 | BA | 75 | 2 | 0.2 | 1,519 | 0.0 | NA |
| IE9 | BA | 75 | 2 | 0.5 | 1,663 | 0.0 | NA |

BA = butyl acetate,
BPO = benzoyl peroxide,
TAIC = triallyl isocyanurate

Examples 29-31

In Example 29 the curable composition was prepared and tested according to the methods of Example 1 except Amorphous Fluoropolymer B was used instead of Amorphous Fluoropolymer A. In Example 30, the solution was prepared and tested according to the methods of Example 16 except Amorphous Fluoropolymer B was used instead of Amorphous Fluoropolymer A. In Example 31, the solution was prepared and tested according to the methods of Example 1 except Amorphous Fluoropolymer C was used instead of Amorphous Fluoropolymer A. The results are summarized in Table 9.

TABLE 9

| Example | Amorphous Fluoropolymer | Solvent | Polymer % | Solution Viscosity @ 200 rad/s (poise) | Cure Rheology @ 130° C. Delta Torque (dNm) | Cure Rheology @ 130° C. Tan Delta |
|---|---|---|---|---|---|---|
| EX29 | B | BA | 75 | 601 | 0.7 | 0.108 |
| EX30 | B | MA | 90 | 9,480 | 4.4 | 0.067 |
| EX31 | C | BA | 75 | 3,770 | 1.9 | 0.169 |

BA = butyl acetate.
MA = methyl acetate

Illustrative Example 10

In Illustrative Example 10, a 50% by weight amorphous fluoropolymer solution was prepared by dissolving 100 g of Amorphous Fluoropolymer D with 2 g of benzoyl peroxide (BPO) and 3 g of triallylisocyanurate (TAIC) in 95 g of ethyl acetate as the solvent (boiling point: 77° C.) in a glass jar. The glass jar was shaken on a shaker for 16 hours and the polymer, BPO, and TAIC were dissolved. "Solution Brookfield Viscosity" was 7.8 poise with LV4 spindle at 100 rpm. The solution viscosity was also measured as described under "Solution DMA Viscosity". However, the viscosity was too low to measure the viscosity by "Solution DMA Viscosity". The sample was cured as described under "Cure Rheology", but there was no cure due to too much solvent. The results are shown in Table 10.

Example 32

A sample of 43.7 g of the solution of Illustrative Example 10 was coated onto a poly(ethylene terephthalate) (PET) film, and the coated solution on the PET sheet was dried in an oven at 50° C. for 30 minutes. After drying, the weight of the coated solution was 22 g, and the calculated amorphous fluoropolymer content of the coated solution was 82.5%. The dried solution was removed from the PET film to measure solution viscosity and cure. The viscosity was measured as described under "Solution DMA Viscosity" and the sample was cured as described under "Cure Rheology".

The dried solution was further cured at 130° C. for 10 minutes. The cured "dried solution" was removed as a film from the PET film and the thickness of the cured film was 0.34 mm. The cured film was clear. Three dumbbells for mechanical property testing were cut from the cured film with ASTM Die D. Tensile strength at break and elongation at break were measured as described under "Mecahnical Properties". The tensile strength at break was 7.6 MPa (1,096 psi) and elongation at break was 623%.

TABLE 10

| Example | Amorphous Fluoropolymer | Solvent | Polymer % | Solution Viscosity @ 200 rad/s (poise) | Cure Rheology @ 130° C. Delta Torque (dNm) | Tan Delta |
|---|---|---|---|---|---|---|
| IE10 | D | EA | 50 | — | 0.0 | — |
| EX32 | D | EA | 70.7 | 1,940 | 1.6 | 0.092 |
| EX33 | D | EA | 97.3 | 13,030 | 7.6 | 0.131 |
| EX34 | E | MEK | 82.5 | 4,657 | 2.8 | 0.167 | film, and the coated solution on the PET sheet was dried in an oven at 50° C. for 10 minutes to evaporate the solvent. After drying, the weight of the coated solution was 30.9 g, and the calculated amorphous fluoropolymer content of the coated solution was 70.7%. The coated solution was removed from the PET film to measure solution viscosity and cure. The viscosity was measured as described under "Solution DMA Viscosity", and the sample was cured as described under "Cure Rheology". The results are shown in Table 10.

Example 33

A sample of 16.7 g of the solution of Illustrative Example 10 was coated onto a PET film, and the coated solution on the PET sheet was dried in an oven at 50° C. for 10 minutes and at 23° C. for 16 hours to evaporate the solvent. After drying, the weight of the coated solution was 8.6 g, and the calculated amorphous fluoropolymer content of the coated solution was 97.3%. The coated solution was removed from the PET film to measure solution viscosity and cure. The viscosity was measured as described under "Solution DMA Viscosity", and the sample was cured as described under "Cure Rheology". The results are shown in Table 10.

Example 34

In Example 34, a 30% by weight amorphous fluoropolymer solution was prepared by dissolving 50 g of Amorphous Fluoroepolymer E with 1 g of benzoyl peroxide (BPO) and 1.5 g of triallylisocyanurate (TAIC) in 114 g of MEK in a glass jar. The glass jar was shaken on a shaker for 16 hours, and the polymer, BPO and TAIC were dissolved. The "Solution Brookfield Viscosity" was 3.4 poise with LV4 spindle at 100 rpm. The solution (60.7 g) was coated onto a PET film, and the coated solution on the PET sheet was dried in an oven at 50° C. for 30 minutes. After drying, the weight of the coated solution was 22 g, and the calculated amorphous fluoropolymer content of the coated solution was 82.5%. The dried solution was removed from the PET film to measure solution viscosity and cure. The viscosity was measured as described under "Solution DMA Viscosity" and the sample was cured as described under "Cure Rheology".

The dried solution was further cured at 130° C. for 10 minutes. The cured "dried solution" was removed as a film from the PET film and the thickness of the cured film was 0.34 mm. The cured film was clear. Three dumbbells for mechanical property testing were cut from the cured film with ASTM Die D. Tensile strength at break and elongation at break were measured as described under "Mecahnical Properties". The tensile strength at break was 7.6 MPa (1,096 psi) and elongation at break was 623%.

Example 35

The solution of Illustrative Example 10 was coated onto a PET film, and the coated solution on the PET sheet was dried in an oven at 50° C. for 10 minutes to evaporate the solvent. After drying for this time and temperature, the calculated amorphous fluoropolymer content of Example 32 was 70.7% (see Example 32 above). The dried solution of Example 35 was further cured at 130° C. for 10 minutes. The cured "dried solution" was removed as a film from the PET film and the thickness of the cured film was 0.3 mm. The cured film was clear and showed a good mechanical property. Transmission was tested using E20 UV-VIS spectroscopy (available from Parkin Elmer Waltham, Mass.). The average transmission of the film from 360 nm to 1100 nm was 81%.

Various modifications and alterations of this disclosure may be made by those skilled the art without departing from the scope and spirit of the disclosure, and it should be understood that this disclosure is not to be unduly limited to the illustrative embodiments set forth herein.

What is claimed:

1. A method of making a cured fluoroelastomer composition, the method comprising:
    providing a curable composition comprising:
        an amorphous, peroxide-curable fluoropolymer, wherein the amorphous, peroxide-curable fluoropolymer is present from 60 percent to 97.5 percent by weight versus the weight of the curable composition,
        a solvent having a solubility parameter in a range from 9.6 $(MPa)^{1/2}$ to 26 $(MPa)^{1/2}$, wherein the solvent is present from 1 percent to 39 percent by weight versus the weight of the curable composition, and an acyl peroxide, and
heating the curable composition at a cure temperature to make the cured fluoroelastomer composition.

2. The method of claim 1, wherein the method does not include first removing the solvent before heating the curable composition.

3. The method of claim 1, wherein the cured fluoroelastomer composition has an average light transmission in a range from 360 nanometers to 1100 nanometers of at least 70 percent.

4. The method of claim 1, wherein the solvent comprises at least one of methyl formate, ethyl formate, methyl acetate, ethyl acetate, n-butyl acetate, tert-butyl acetate, or dimethyl carbonate.

5. The method of claim 1, wherein cured fluoroelastomer is present in a range from greater than 80 percent by weight to 97.5 percent by weight versus the weight of the cured fluoroelastomer composition.

6. The method of claim 1, wherein cured fluoroelastomer is present in a range from 60 percent by weight to less than 80 percent by weight versus the weight of the cured fluoroelastomer composition.

7. The method of claim 1, wherein the curable composition further comprises a crosslinker.

8. The method of claim 7, wherein the crosslinker is tri(methyl)allyl isocyanurate, triallyl isocyanurate, tri(methyl)allyl cyanurate, poly-triallyl isocyanurate, xylylene-bis (diallyl isocyanurate), N,N'-m-phenylene bismaleimide, diallyl phthalate, tris(diallylamine)-s-triazine, triallyl phosphite, 1,2-polybutadiene, ethyleneglycol diacrylate, diethyleneglycol diacrylate, or $CH_2=CH-R_f-CH=CH_2$ wherein $R_f$ is a perfluoroalkylene having from 1 to 8 carbon atoms.

9. The method of claim 1, wherein the amorphous, peroxide-curable fluoropolymer comprises a bromo- or iodo-cure site.

10. The method of claim 1, wherein the curable composition has at least one of a delta torque at 130° C. for 12 minutes greater than 0.5 dNm as measured by a sealed torsion shear rotorless curemeter in accordance with ASTM D 5289-07 or a tan delta after 12 minutes at 130° C. of less than 0.3 as measured by a sealed torsion shear rotorless curemeter in accordance with ASTM D 5289-07.

11. The method of claim 1,
wherein cured fluoroelastomer is present from 60 percent to 97.5 percent by weight versus the weight of the cured fluoroelastomer composition, and
wherein the solvent is present from 1 percent to 39 percent by weight versus the weight of the cured fluoroelastomer composition.

12. The method of claim 11, wherein the cured fluoroelastomer composition does not include an ionic liquid.

13. The method of claim 1, wherein the cure temperature is above 100° C.

14. The method of claim 1, wherein the cure temperature is at least the ten-hour half-life temperature of the peroxide.

15. The method of claim 1, wherein the curable composition is positioned on a substrate before heating the curable composition.

16. The method of claim 1, wherein the solvent is present from 19 percent to 39 percent by weight versus the weight of the curable composition.

17. The method of claim 1, wherein the amorphous, peroxide-curable fluoropolymer is present in a range from 60 percent by weight to less than 80 percent by weight versus the weight of the curable composition.

18. The method of claim 1, wherein the amorphous, peroxide-curable fluoropolymer is present in a range from greater than 80 percent by weight to 97.5 percent by weight versus the weight of the curable composition.

19. The method of claim 1, wherein the solvent has a boiling point in a range from 30° C. to 200° C.

20. The method of claim 1, wherein the solvent comprises at least one of methyl acetate, ethyl acetate, n-butyl acetate, or tert-butyl acetate.

* * * * *

UNITED STATES PATENT AND TRADEMARK OFFICE
CERTIFICATE OF CORRECTION

PATENT NO. : 11,130,829 B2
APPLICATION NO. : 16/793947
DATED : September 28, 2021
INVENTOR(S) : Fukushi It is certified that error appears in the above-identified patent and that said Letters Patent is hereby corrected as shown below:

In the Claims

Column 27
Line 15, In Claim 5, before "cured", insert --the--.
Line 19, In Claim 6, before "cured", insert --the--.

Column 28
Line 7, In Claim 11, before "cured", insert --the--.

Signed and Sealed this
Twenty-sixth Day of April, 2022

Katherine Kelly Vidal
*Director of the United States Patent and Trademark Office*